United States Patent
Nicholls et al.

(10) Patent No.: US 9,424,868 B1
(45) Date of Patent: Aug. 23, 2016

(54) DATA STORAGE DEVICE EMPLOYING SPINDLE MOTOR DRIVING PROFILE DURING SEEK TO IMPROVE POWER PERFORMANCE

(71) Applicant: Western Digital Technologies, Inc., Irvine, CA (US)

(72) Inventors: Michael Troy Nicholls, Laguna Hills, CA (US); Wei Xi, Mission Viejo, CA (US); Jie Wan, Singapore (SG); Jie Yu, Irvine, CA (US); Jun Xu, Singapore (SG); Danny J. Kastler, Longmont, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/740,098

(22) Filed: Jun. 15, 2015

Related U.S. Application Data

(60) Provisional application No. 62/160,564, filed on May 12, 2015.

(51) Int. Cl.
| | |
|---|---|
| *G11B 15/46* | (2006.01) |
| *G11B 19/02* | (2006.01) |
| *G11B 5/55* | (2006.01) |
| *G11B 5/52* | (2006.01) |

(52) U.S. Cl.
CPC ............... *G11B 5/5582* (2013.01); *G11B 5/52* (2013.01); *G11B 5/5547* (2013.01)

(58) Field of Classification Search
None
See application file for complete search history.

(56) References Cited

U.S. PATENT DOCUMENTS

| | | | |
|---|---|---|---|
| 5,157,560 A | 10/1992 | Kanda et al. | |
| 5,381,279 A | 1/1995 | Dunn | |
| 5,521,896 A * | 5/1996 | Bajorek | G06F 1/3215 360/69 |
| 5,589,996 A * | 12/1996 | Patrick | G11B 19/28 360/71 |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |
| 6,282,046 B1 | 8/2001 | Houston et al. | |

(Continued)

*Primary Examiner* — K. Wong

(57) ABSTRACT

A data storage device is disclosed comprising a spindle motor configured to rotate a disk, wherein the spindle motor comprises a plurality of windings, and a head actuated over the disk. The windings of the spindle motor are commutated based on a commutation sequence while applying a periodic driving voltage to each winding. During a seek operation to seek the head a seek length, an amplitude of the periodic driving voltage is adjusted according to a driving profile corresponding to the seek length, wherein the driving profile compensates for a power disturbance during the seek operation.

25 Claims, 6 Drawing Sheets

(56) References Cited

U.S. PATENT DOCUMENTS

| | | |
|---|---|---|
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,567 B2 * | 3/2004 | Heydt .................. G11B 19/20 318/162 |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,741,414 B1 | 5/2004 | Boyd et al. |
| 6,747,837 B1 | 6/2004 | Bennett |
| 6,753,667 B2 * | 6/2004 | Sakamoto ............ G11B 19/28 318/433 |
| 6,760,186 B1 | 7/2004 | Codilian et al. |
| 6,781,787 B1 | 8/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,937,431 B2 * | 8/2005 | Galloway ............ G11B 5/5526 360/78.06 |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,309,967 B2 | 12/2007 | Moser et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,359,140 B2 * | 4/2008 | Chung ................ G11B 5/5547 318/560 |
| 7,365,932 B1 | 4/2008 | Bennett |
| 7,388,728 B1 | 6/2008 | Chen et al. |
| 7,391,583 B1 | 6/2008 | Sheh et al. |

(56) References Cited

U.S. PATENT DOCUMENTS

| | | |
|---|---|---|
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,049,985 B2 | 11/2011 | Zhu et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,654,477 B2 | 2/2014 | Sosseh |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |

(56) References Cited

U.S. PATENT DOCUMENTS

| | | |
|---|---|---|
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 9,025,270 B1 | 5/2015 | Nowell et al. |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |
| 2013/0290611 A1 | 10/2013 | Biederman et al. |

\* cited by examiner

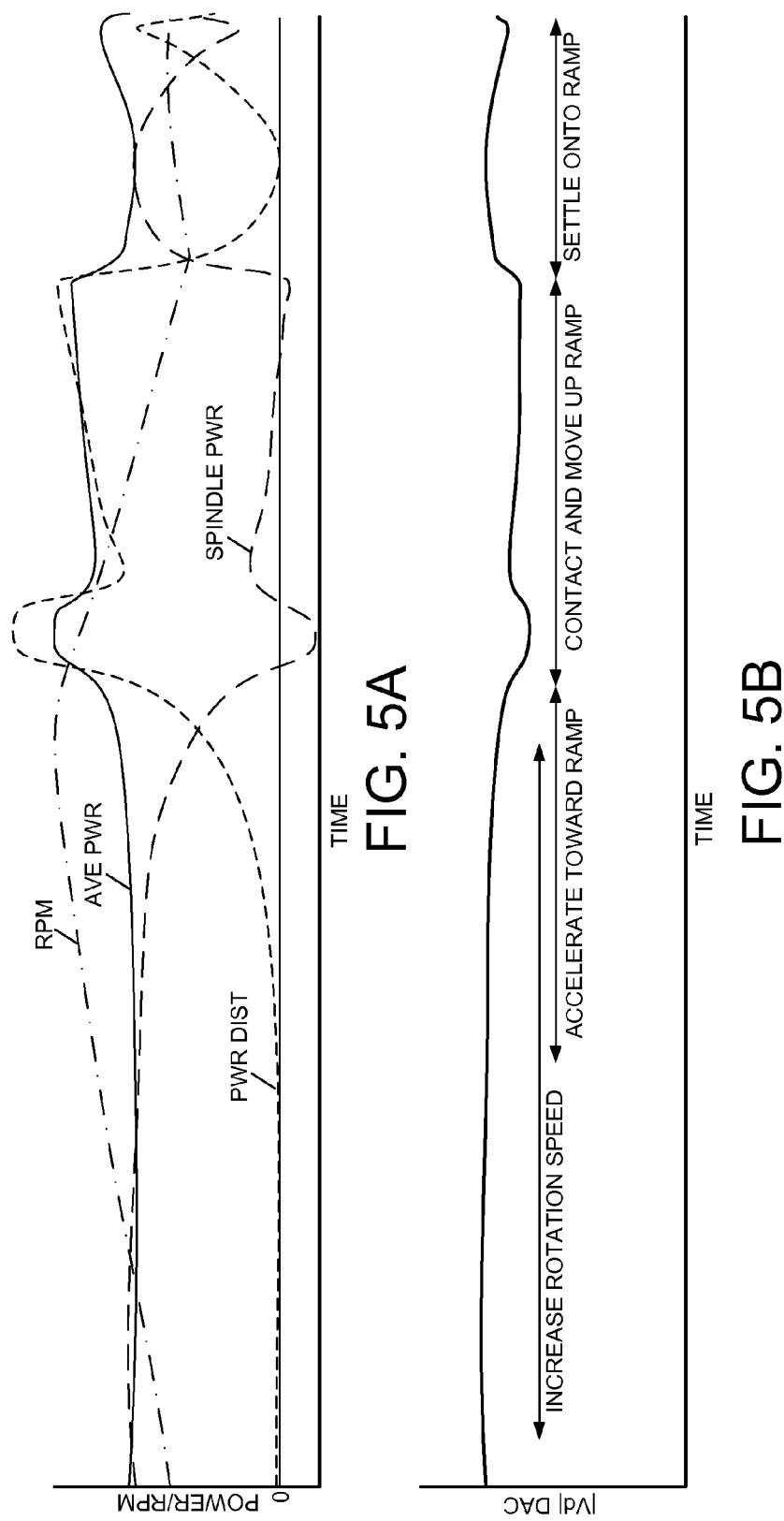

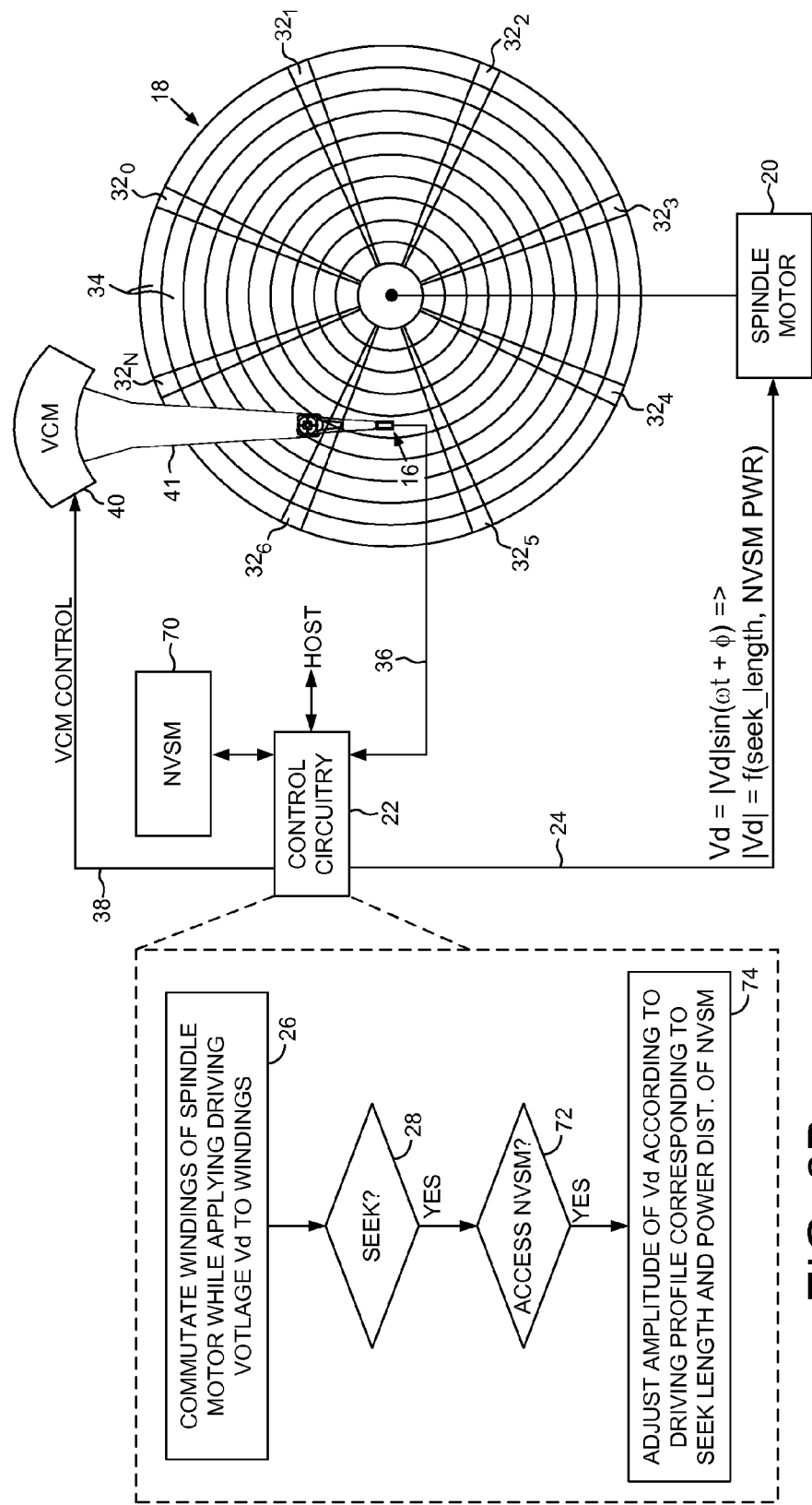

DATA STORAGE DEVICE EMPLOYING SPINDLE MOTOR DRIVING PROFILE DURING SEEK TO IMPROVE POWER PERFORMANCE

CROSS-REFERENCE TO RELATED APPLICATION

This application claims priority to provisional U.S. Patent Application Ser. No. 62/160,564, filed on May 12, 2015, which is hereby incorporated by reference in its entirety.

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it track seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a track seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

The disk 2 is typically rotated by a spindle motor at a high speed so that an air bearing forms between the head and the disk surface. A commutation controller applies a driving signal to the windings of the spindle motor using a particular commutation sequence in order to generate a rotating magnetic field that causes the spindle motor to rotate. Prior art disk drives have typically controlled the commutation of the windings by measuring a zero-crossing frequency of a back electromotive force (BEMF) voltage generated by the windings of the spindle motor. Prior art disk drives may also utilize the BEMF voltage generated by the spindle motor as a power source during power failure to assist with power down operations, such as unloading the head onto a ramp.

BRIEF DESCRIPTION OF THE DRAWINGS

FIG. 5A illustrates an example of a power disturbance during a seek operation due to a voice coil motor (VCM) unloading the head onto a ramp.

FIG. 5B illustrates an example driving profile for adjusting the amplitude of the periodic driving voltage applied to the windings of the spindle motor to compensate for the power disturbance during the seek (unload operation).

FIG. 6A shows a data storage device in the form of a disk drive according to an embodiment comprising a head actuated over a disk, a spindle motor configured to rotate the disk, and a non-volatile semiconductor memory (NVSM).

FIG. 6B is a flow diagram according to an embodiment wherein during a seek operation to seek the head a seek length, an amplitude of the periodic driving voltage applied to the windings of the spindle motor is adjusted according to a driving profile corresponding to the seek length, wherein the driving profile compensates for a power disturbance due to accessing the NVSM during the seek operation.

DETAILED DESCRIPTION

Figure 2A:
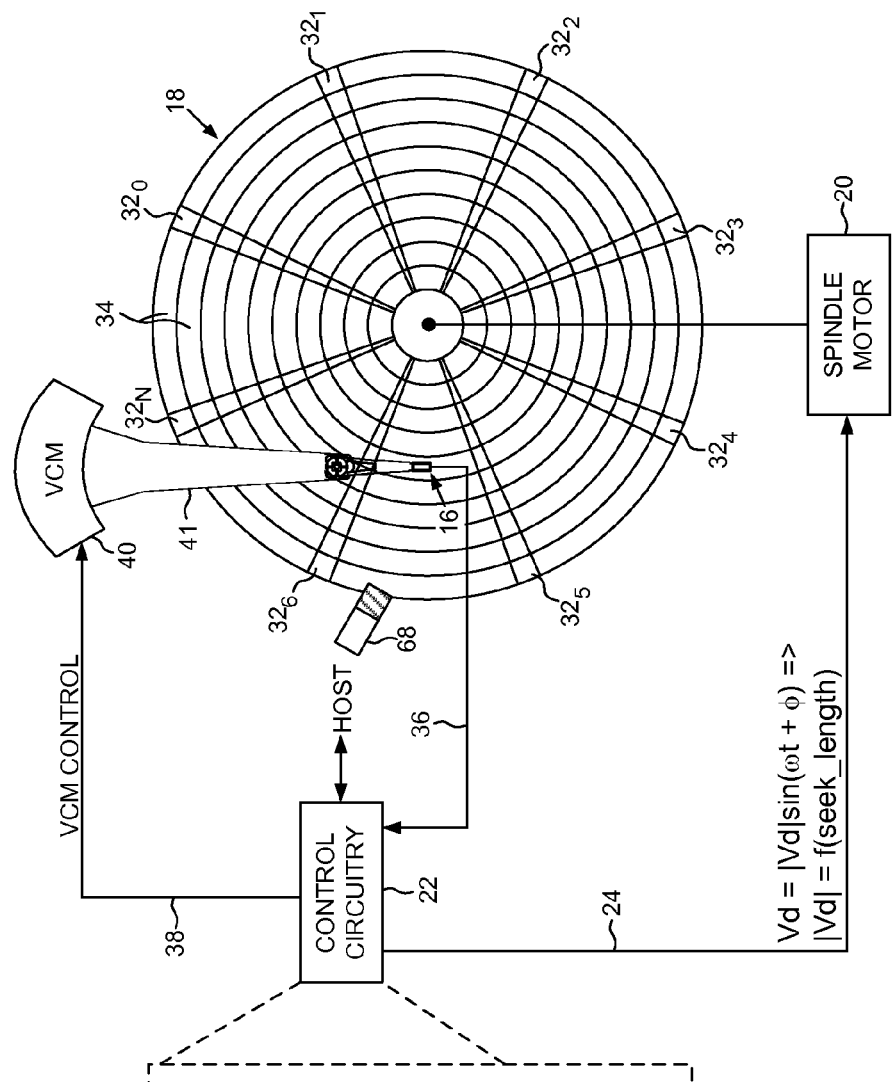
FIG. 2A shows a data storage device in the form of a disk drive according to an embodiment comprising a head actuated over a disk, and a spindle motor configured to rotate the disk.
Figure 2B:
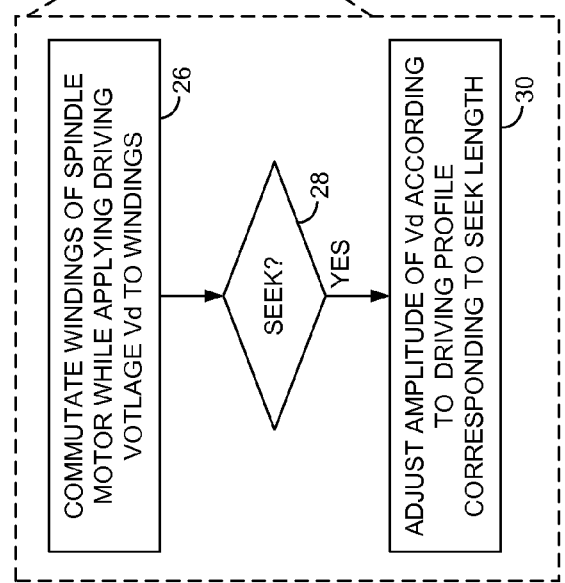
FIG. 2B is a flow diagram according to an embodiment wherein during a seek operation to seek the head a seek length, an amplitude of the periodic driving voltage applied to the windings of the spindle motor is adjusted according to a driving profile corresponding to the seek length, wherein the driving profile compensates for a power disturbance during the seek operation.

FIG. 2A shows a data storage device in the form of a disk drive according to an embodiment comprising a head 16 actuated over a disk 18, and a spindle motor 20 configured to rotate a disk 18, wherein the spindle motor 20 comprises a plurality of windings. The disk drive further comprises control circuitry 22 configured to execute the flow diagram of FIG. 2B, wherein the windings of the spindle motor are commutated based on a commutation sequence while applying a periodic driving voltage 24 to each winding (block 26). During a seek operation to seek the head a seek length (block 28), an amplitude of the periodic driving voltage 24 is adjusted according to a driving profile corresponding to the seek length (block 30), wherein the driving profile compensates for a power disturbance during the seek operation. A seek operation may include a track seek operation where the head is moved from one track to another, an unload operation where the head is moved from the disk to the ramp, and a load operation where the head is moved from the ramp to the disk.

Figure 1:
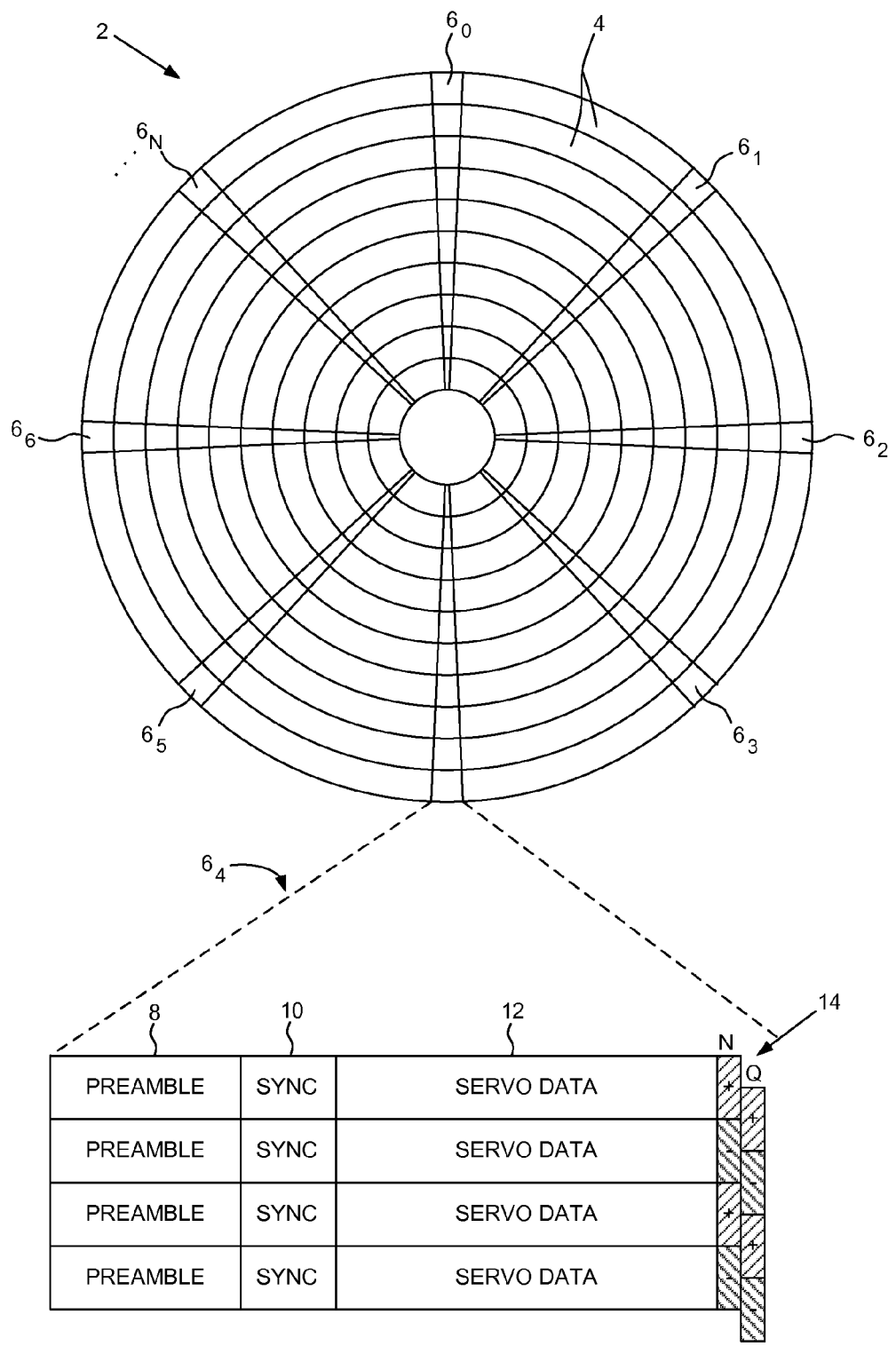
FIG. 1 shows a prior art disk format comprising a plurality of servo tracks defined by servo sectors.

In the embodiment of FIG. 2A, the disk 18 comprises a plurality of servo sectors $32_0$-$32_N$ that define a plurality of servo tracks 34, wherein data tracks are defined relative to the servo tracks at the same or different radial density. The control circuitry 22 processes a read signal 36 emanating from the head 16 to demodulate the servo sectors $32_0$-$32_N$ and generate a position error signal (PES) representing an error between the actual position of the head and a target position relative to a target track. A servo control system in the control circuitry 22 filters the PES using a suitable compensation filter to generate a control signal 38 applied to a voice coil motor (VCM) 40 which rotates an actuator arm 41 about a pivot in order to actuate the head 16 radially over the disk 18 in a direction that reduces the PES. The servo sectors $32_0$-$32_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

Figure 3:
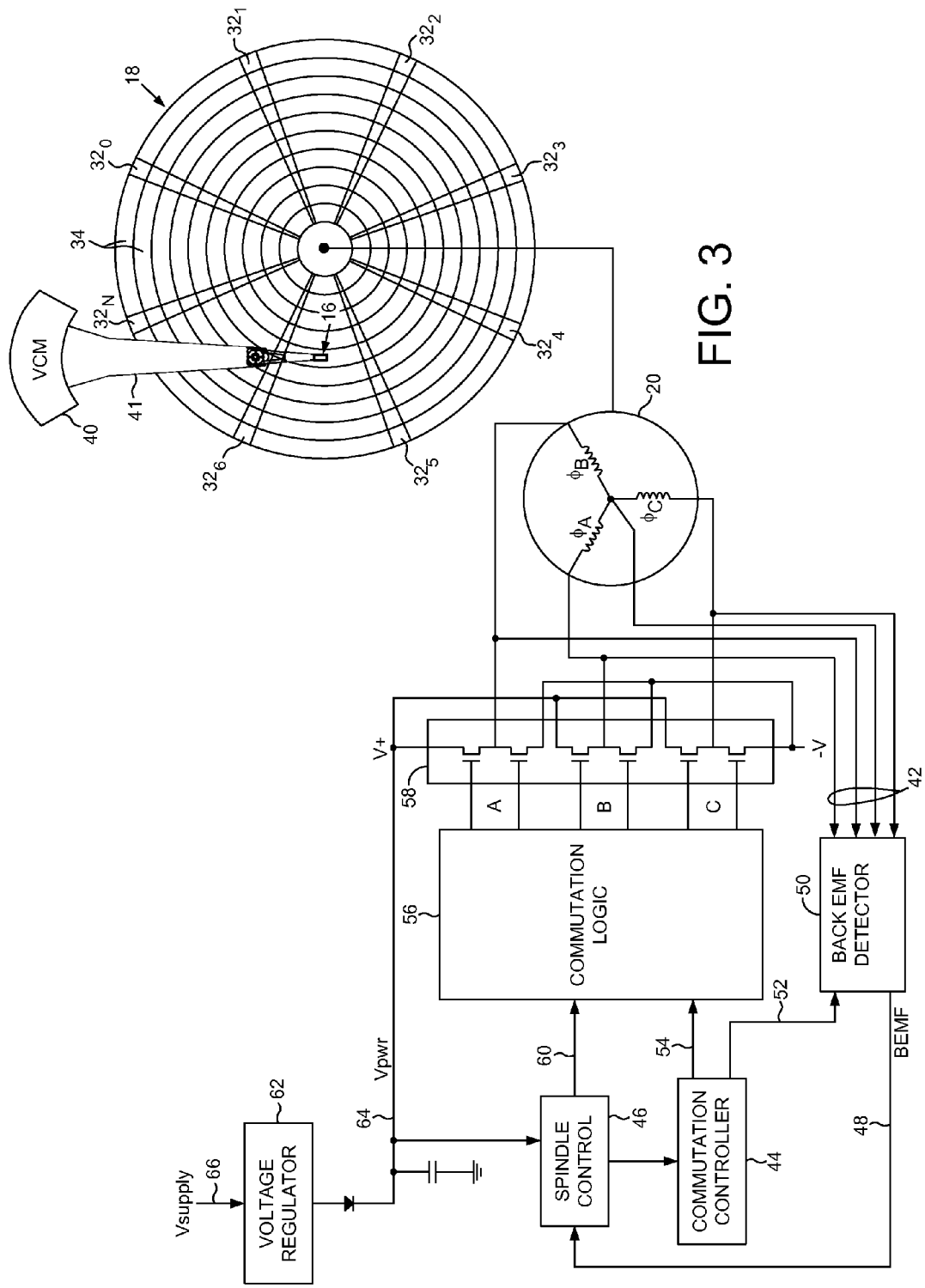
FIG. 3 shows control circuitry according to an embodiment comprising a spindle control block, a commutation controller, commutation logic, and a voltage regulator configured to generate a power voltage for powering the spindle motor based on a supply voltage received from a host.

FIG. 3 shows control circuitry 22 according to an embodiment wherein a back electromotive force (BEMF) voltage 42 generated by the windings of the spindle motor 20 may be processed in order to drive the commutation sequence of a commutation controller 44. A spindle control block 46 may process a BEMF signal 48 which may be a square wave representing the BEMF zero-crossings as detected by a BEMF detector 50. The commutation controller 44 may generate a control signal 52 which configures the BEMF detector 50 to detect the zero-crossing of the BEMF voltage generated by each winding as the disk rotates. The commutation controller 44 also generates a control signal 54 applied to commutation logic 56. In the embodiment of FIG. 3, the commutation logic 56 is configured by the control signal 54 to control the state of switches 58 in order to drive the windings with driving voltages +V and −V. The commutation logic 56 may operate in any suitable manner, such as by driving the switches 58 as linear amplifiers that apply continuous-time sinusoidal voltages to the windings. In another embodiment, the commutation logic 56 may drive the switches 58 using pulse width modulation (PWM), such as using square wave PWM, trapezoidal PWM, or sinusoidal PWM. Regardless as to how the windings are driven, the commutation controller 44 generates the control signal 54 so that the windings are commutated at the correct periods, thereby generating the desired rotating magnetic field that causes the spindle motor to rotate. In one embodiment, the spindle control block 46 may generate a control signal 60 that controls the effective amplitude of the periodic driving voltage applied to the windings (continuous or PWM), thereby controlling the speed of the spindle motor 20. A voltage regulator 62 generates a power voltage Vpwr 64 based on a supply voltage 66 received from a host, wherein the power voltage Vpwr 64 is configured to power the spindle motor 20.

In one embodiment, it may be desirable to limit the power consumption of the disk drive, such as by minimizing at least one of an average power consumption, peak power consumption, and root-mean-square power consumption in order, for example, to satisfy the host specified power constraints of the supply voltage 66. As described in greater detail below, the disk drive may exhibit a high power demand during seek operations due to the power consumed by the VCM 40 when rotating the actuator arm 41, including during load/unload operations. Accordingly, in one embodiment the periodic driving voltage applied to the spindle motor 20 may be adjusted according to a driving profile that compensates for a power disturbance during the seek operation, such as the power consumed by the VCM 40. In this manner, the seek operations may be executed with the desired performance without violating the power constraints of the supply voltage 66.

In one embodiment, the total average power loss may be represented as the sum of the power consumed by the voltage regulator 62 (FIG. 3) and the power consumed by the various components of the disk drive:

$$\overline{P}_{tot} = \overline{P}_{supply} + \overline{P}_{drive}$$

In one embodiment, the average power consumed by the voltage regulator may be based on the lumped resistance R (e.g., switching FET, inductor, line resistance, and battery):

$$\overline{P}_{supply} = Ri_{RMS}^2 \overline{P}_{supply} = Ri_{RMS}^2.$$

In one embodiment, the average power consumed by the components of the disk drive $\overline{P}_{drive} = v_{drive} i_{avg}$ may be represented as:

$$\overline{P}_{drive} = V_{pwr} i_{avg}$$

since $V_{pwr}$ 64 is held substantially constant by the voltage regulator. Therefore, the total average power loss is dependent on the average and RMS drive current:

$$\overline{P}_{tot} = Ri_{RMS}^2 + V_{pwr} i_{avg}$$

In one embodiment, the drive current may be represented as:

$$i_{drive}(t) = \frac{P_{spindle}(D_{AC}) + P_{disturbance}(t)}{V_{drive}}$$

where $P_{spindle}(D_{AC})$ represents the power consumed by the spindle motor at a given amplitude of the driving voltage, and $P_{disturbance}(t)$ represents a power disturbance during a seek operation, such as the power consumed by the VCM 40 during a seek operation. Accordingly, in one embodiment the amplitude of the driving voltage is adjusted (by adjusting a digital-to-analog converter setting $D_{AC}$) according to a driving profile that compensates for the power disturbance during the seek operation.

In one embodiment, the driving profile for the spindle motor is generated so as to minimize the average power consumption during a seek operation. In one embodiment, the driving profile for the spindle motor adjusts the speed of the spindle motor during the seek, but ensures the ending rotation speed of the spindle motor substantially matches the starting rotation speed. In this manner, at the end of the seek operation the disk is rotating at an access rotation speed so that the disk may be accessed (during write/read operations). Accordingly, in one embodiment a power consumption constraint is satisfied while also satisfying the following constraints:

$$RPM(end) = RPM(start)$$

$$\frac{\partial RPM(end)}{\partial t} = 0$$

$$minDAC < D_{AC} < maxDAC$$

$$|i_{phase}| < maxi_{phase}$$

$$|v_{phase}| < maxv_{phase}$$

where RPM represents the spindle rotation speed, $i_{phase}$ represents an amplitude of current flowing through a winding of the spindle motor and $v_{phase}$ represents an amplitude of the driving voltage across the winding. In one embodiment, the limit values in the above constraints are determined by the disk drive specifications.

In one embodiment, the optimization is done over the disturbance period during the seek operation. All values are represented as a vector of samples for each servo sector (wedge) in the disturbance period. For example, drive current can be represented as:

$$i_{drive} = [i_{drive}(\text{wedge 1}), i_{drive}(\text{wedge 2}) \ldots i_{drive}(\text{end wedge})]^T.$$

Rewriting the above equations using these vectors:

$$\overline{P}_{tot} = R i_{drive}^T i_{drive} + v_{drive}^T e^T i_{drive}$$

$$i_{drive} = P_{spindle} + P_{disturbance}/v_{drive}$$

$e = [1 1 \ldots 1]^T$ of appropriate length representing the disturbance period.

Gradients:

$$\frac{\partial \overline{P}_{tot}}{\partial D_{AC}} = (2 R i_{drive}^T + v_{drive} e^T) \frac{\partial i_{drive}}{\partial D_{AC}}$$

$$\frac{\partial i_{drive}}{\partial D_{AC}} = 1/v_{drive} \frac{\partial P_{spindle}}{\partial D_{AC}}$$

Spindle Power Model:

$$P_{spindle} = i_{phase} \cdot * v_{phase}$$

$$v_{phase} = [v_{phaseA}^T v_{phaseB}^T v_{phaseC}^T]^T$$

$$i_{phase} = [i_{phaseA}^T i_{phaseB}^T i_{phaseC}^T]^T$$

Gradient:

$$\frac{\partial P_{spindle}}{\partial D_{AC}} = i_{phase} e^T \cdot * \frac{\partial v_{phase}}{\partial D_{AC}} + v_{phase} e^T \cdot * \frac{\partial i_{phase}}{\partial D_{AC}}$$

Spindle Phase Model $$v_{phaseX}(t) = v_{BEMF,X} + R_{phase} i_{phaseX}(t) + L_{phase} \frac{d i_{phase,X}(t)}{dt}$$

$$H_{phase,X}(s) = \frac{i_{phase,X}}{v_{phase,X} - v_{BEMF,X}}(s) = \frac{1}{R_{phase} + L_{phase} s}$$

$h_{phase,x}(n)$ is the discrete time impulse response of $H_{phase,x}(s)$ found using the bilinear transform.

$$H_{phase,X} = \begin{bmatrix} h_{phase,X}(0) & 0 & 0 & 0 \\ h_{phase,X}(1) & h_{phase,X}(0) & 0 & 0 \\ \vdots & h_{phase,X}(1) & h_{phase,X}(0) & 0 \\ h_{phase,X}(\text{end}) & \ldots & h_{phase,X}(1) & h_{phase,X}(0) \end{bmatrix}$$

$$i_{phase} = H_{phase}(v_{phase} - v_{phase0}) + i_{phase0}$$

$$H_{phase} = \begin{bmatrix} H_{phase,X} & 0 & 0 \\ 0 & H_{phase,X} & 0 \\ 0 & 0 & H_{phase,X} \end{bmatrix}$$

$v_{phase0} = [v_{phaseA0}^T \; v_{phaseB0}^T \; v_{phaseC0}^T]^T$ Nominal Phase Voltage $i_{phase0} = [i_{phaseA0}^T \; i_{phaseB0}^T \; i_{phaseC0}^T]^T$ Nominal Phase current Gradient:

$$\frac{\partial i_{phase}}{\partial D_{AC}} = H_{phase} \frac{\partial v_{phase}}{\partial D_{AC}}$$

Spindle DAC Model:

$$v_{phase} = A D_{AC}$$

$$A = \frac{\text{MaxDacFF}}{\text{MaxDAC}\sqrt{3}} \begin{bmatrix} \text{diag}[\sin(w_e t + \phi_{Torque} + \phi_A)] \\ \text{diag}[\sin(w_e t + \phi_{Torque} + \phi_B)] \\ \text{diag}[\sin(w_e t + \phi_{Torque} + \phi_C)] \end{bmatrix}$$

MaxDacFF: Max Spindle DAC FF ADC voltage
$w_e$: electrical frequency [rad/s]
$\phi_{Torque}$: Torque Optimizer Electrical angle Gradient:

$$\frac{\partial v_{phase}}{\partial D_{AC}} = A$$

Spindle Torque Model:

$$\tau(t) = k_t \sum \sin(w_e t + \phi_{phase,X}) i_{phase,X}(t)$$

$$\tau = B i_{phase}$$

$$B = k_t [\text{diag}[\sin(w_e t + \phi_A)] \; \text{diag}[\sin(w_e t + \phi_B)] \; \text{diag}[\sin(w_e t + \phi_C)]]$$

$$k_t = k_{e,peak} \frac{60}{1000 * 2\pi * \sqrt{3}} : \text{Peak phase } Kt \; [N\text{-}m/A]$$

Spindle Speed Model:

$$J \frac{d w_{RPM}}{dt}(t) = -\beta w_{RPM}(t) + \tau(t)$$

$$H_{RPM}(s) = \frac{w_{RPM}}{\tau}(s) = \frac{1}{\beta + Js}$$

$h_{RPM}(n)$ is the discrete time impulse response of $H_{RPM}(s)$ found using the bilinear transform.

$$H_{RPM} = \begin{bmatrix} h_{RPM}(0) & 0 & 0 & 0 \\ h_{RPM}(1) & h_{RPM}(0) & 0 & 0 \\ \vdots & h_{RPM}(1) & h_{RPM}(0) & 0 \\ h_{RPM}(\text{end}) & \ldots & h_{RPM}(1) & h_{RPM}(0) \end{bmatrix}$$

$$w_{RPM} = H_{RPM}(\tau - \tau_0) + w_{RPM0}$$

In one embodiment, the above equations may be solved using any suitable numerical computing program (e.g., using MATLAB) so as to satisfy any suitable power consumption constraint, such as minimizing one of the average power consumption, peak power consumption, or root-mean-square (RMS) power consumption of the disk drive during a seek operation as well as satisfy the above constraint that the rotation speed of the spindle motor at the end of the seek substantially match the rotation speed at the start of the seek.

In one embodiment, the above equations may be solved to achieve a target weighting of at least two of an average power consumption, a peak power consumption, and a root-mean-square (RMS) power consumption of the data storage device during the seek.

Figure 4A:
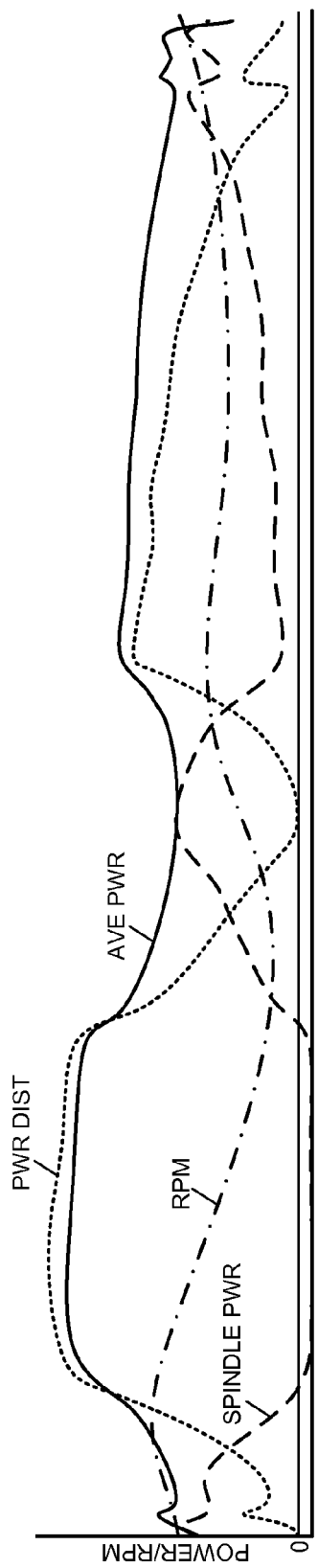
FIG. 4A illustrates an example of a power disturbance during a seek operation due to a voice coil motor (VCM) moving the head to a target track.
Figure 4B:
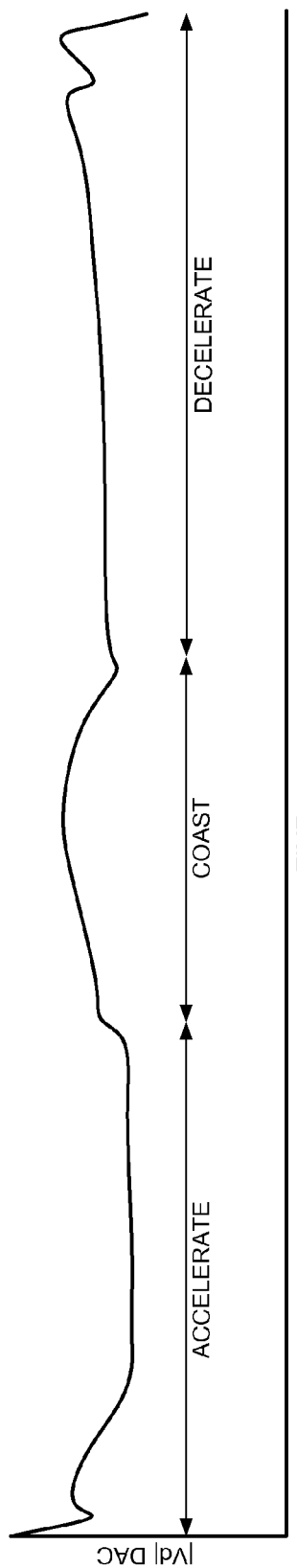
FIG. 4B illustrates an example driving profile for adjusting the amplitude of the periodic driving voltage applied to the windings of the spindle motor to compensate for the power disturbance during the seek.

FIGS. 4A and 4B illustrate a solution to the above equations for the driving profile (FIG. 4B) that substantially minimizes the average power consumption of the disk drive for a particular seek length when seeking the head to a target track. As shown in FIG. 4A, the power disturbance (PWR DIST) waveform during the seek is due to the power consumed by the VCM 40 during an acceleration phase, coast phase, and deceleration phase. If the rotation speed of the spindle motor 20 were maintained at the access rotation speed during the seek, the power consumed by the spindle motor 20 as well as the VCM 40 may exceed the constraints on the supply voltage 66. Since the disk 18 is not accessed during a seek (other than to read the servo sectors $32_0$-$32_N$), in one embodiment the rotation speed of the spindle motor 20 is adjusted by the driving profile shown in FIG. 4B in order to reduce the power consumed by the spindle motor 20 during the seek. In the example shown in FIG. 4A, the driving profile brakes the spindle motor 20 so as to extract power from the spindle motor 20 during at last part of the seek (acceleration phase in this example). That is, not only is the power consumed by the spindle motor 20 reduced, in one embodiment the driving profile may cause the spindle motor 20 to generate power for the VCM 40 during at least part of the seek which further reduces the power extracted from the supply voltage 66. In this example, the driving profile shown in FIG. 4B substantially minimizes the average power waveform (AVE PWR) in FIG. 4A.

Although as shown in FIG. 4A the driving profile adjusts the rotation speed (RPM) of the spindle motor 20 during the seek (and therefore reduces the power consumption during the seek), the above equations are solved so that the driving profile ensures the ending rotation speed at the end of the seek substantially matches the starting rotation speed at the beginning of the seek. This ensures that at the end of the seek the disk 18 is rotating at the access rotation speed required to access the disk, thereby avoiding any latency (or slipped disk revolutions) that would otherwise occur while waiting for the spindle motor 20 to re-acquire the access rotation speed.

The driving profile shown in the example of FIG. 4B corresponds to a particular seek length; that is, the power disturbance (PWR DIST) waveform shown in FIG. 4A will have a particular shape for each seek length. Accordingly, in one embodiment the above equations are solved for a plurality of different seek lengths and the resulting driving profiles stored in memory (e.g., on the disk 18). When the control circuitry executes a seek having a particular seek length, the corresponding driving profile is retrieved from memory and applied to the spindle motor 20 during the seek. In one embodiment, the driving profile may be generated and stored for a plurality of discrete seek lengths at any suitable resolution, and then intermediate driving profiles may be generated on-the-fly through interpolation.

In one embodiment, the above equations are solved to generate a stepped driving profile, wherein each step (sample value) in the driving profile corresponds to a servo sector on the disk 18. That is, during a seek operation the control circuitry adjusts the amplitude of the driving voltage applied to the spindle motor 20 at each servo sector based on the corresponding step value stored in the driving profile. However, the above equations may be modified to generate the driving profile at a finer/coarser resolution than the servo sector frequency. In other embodiments, the control circuitry may include circuitry for smoothing the amplitude of the driving voltage between the step values specified by the driving profile.

In one embodiment such as shown in FIG. 2A, the control circuitry 22 may load the head 16 from a ramp 68 onto the disk 18 (after the disk is rotating), and then unload the head 16 onto the ramp 68 (e.g., when the disk drive is powered down or idled). In one embodiment, the seek length referred to at block 30 of FIG. 2B may comprise the distance the head 16 travels during a load and/or unload operation. That is, in one embodiment the power disturbance associated with a load and/or unload operation may be known and therefore a driving profile for the spindle motor 20 may be generated based on the above equations in order to achieve any suitable power consumption constraint during the load and/or unload operation. An example driving profile and corresponding power/RPM waveforms for an unload operation is illustrated in FIGS. 5A and 5B.

In the example unload operation shown in FIGS. 5A and 5B, the control circuitry 22 first seeks the head 16 to an outer diameter track, and then unloads the head 16 onto the ramp 68 from the outer diameter track. While the head 16 is served over the outer diameter track, the driving profile shown in FIG. 5B increases the rotation speed of the spindle motor 20 before moving (accelerating) the head 16 toward the ramp 68. In this embodiment, increasing the rotation speed of the spindle motor 20 increases its kinetic energy so that when the head 16 contacts the ramp 68 the resulting spike in the power disturbance shown in FIG. 5A may be compensated by supplementing the power to the VCM 40 from the spindle motor 20 rather than from the supply voltage 66. In one embodiment when executing a seek operation (e.g., an unload operation), the driving profile such as shown in FIG. 5B is configured to increase the rotation speed of the spindle motor above an access speed used to access the disk by at least twice a maximum jitter error, where the maximum jitter error represents the maximum deviation of the rotation speed from the target access speed when accessing the disk. For example, in one embodiment a write operation to the disk may be aborted if the rotation speed deviates from the target access speed by a maximum jitter error of 0.02% of the access speed. Therefore in one embodiment when executing a seek operation (e.g., an unload operation), the rotation speed may be increased by at least 0.04% of the access speed in order to increase the kinetic energy of the spindle motor. The rotation speed of the spindle motor may be increased by any suitable amount, and in one embodiment the rotation speed may be increased by not more than 20% of the access speed.

The driving profile for the spindle motor 20 may be generated by solving the above equations in order to compensate for any known power disturbance in the disk drive. FIG. 6A shows an embodiment wherein the disk drive may comprise a non-volatile semiconductor memory (NVSM) 70, such as a flash memory, which may induce a power disturbance if accessed during a seek operation. Accordingly, in an embodiment illustrated by the flow diagram of FIG. 6B, if the NVSM 70 is accessed during a seek operation (block 72), the driving profile may be generated based on the above equations to compensate for the corresponding power disturbance (block 74) similar to the embodiments described above.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
    a head actuated over a disk; and
    a spindle motor configured to rotate the disk, wherein the spindle motor comprises a plurality of windings;
    control circuitry configured to:
        commutate the windings of the spindle motor based on a commutation sequence while applying a periodic driving voltage to each winding; and
        during a seek operation to seek the head a seek length, adjust an amplitude of the periodic driving voltage according to a driving profile corresponding to the seek length, wherein the driving profile compensates for a power disturbance during the seek operation.

2. The data storage device as recited in claim 1, wherein the driving profile substantially achieves:

$$RPM(end)=RPM(start)$$

where:
    RPM(start) represents the rotation speed of the spindle motor at the start of the seek; and
    RPM(end) represents the rotation speed of the spindle motor at the end of the seek.

3. The data storage device as recited in claim 2, wherein the driving profile substantially achieves:

$$\frac{\partial RPM(end)}{dt} = 0.$$

4. The data storage device as recited in claim 1, wherein the driving profile substantially minimizes at least one of an average power consumption, a peak power consumption, and a root-mean-square (RMS) power consumption of the data storage device during the seek.

5. The data storage device as recited in claim 1, wherein the driving profile achieves a target weighting of at least two of an average power consumption, a peak power consumption, and a root-mean-square (RMS) power consumption of the data storage device during the seek.

6. The data storage device as recited in claim 1, further comprising a non-volatile semiconductor memory, wherein the driving profile compensates for a power disturbance caused by accessing the non-volatile semiconductor memory during the seek operation.

7. The data storage device as recited in claim 1, wherein the seek length comprises loading the head from a ramp over the disk.

8. The data storage device as recited in claim 1, wherein the seek length comprises unloading the head from the disk onto a ramp.

9. The data storage device as recited in claim 1, wherein the disk comprises a plurality of servo tracks defined by servo sectors and the control circuitry is further configured to adjust the amplitude of the periodic driving voltage at each servo sector based on the driving profile.

10. The data storage device as recited in claim 1, wherein:
    the control circuitry is further configured to adjust the amplitude of the periodic driving voltage so that a rotation speed of the spindle motor substantially equals an access rotation speed when accessing the disk; and
    the driving profile is configured to increase the rotation speed of the spindle motor at least five percent above the access rotation speed during at least part of the seek operation.

11. A method of operating a data storage device, the method comprising:
    commutating windings of a spindle motor based on a commutation sequence while applying a periodic driving voltage to each winding, wherein the spindle motor is configured to rotate a disk; and during a seek operation to seek a head a seek length, adjust an amplitude of the periodic driving voltage according to a driving profile corresponding to the seek length, wherein the driving profile compensates for a power disturbance during the seek operation.

12. The method as recited in claim 11, wherein the driving profile substantially achieves a constraint:

RPM(end)=RPM(start)

where:
RPM(start) represents the rotation speed of the spindle motor at the start of the seek; and
RPM(end) represents the rotation speed of the spindle motor at the end of the seek.

13. The method as recited in claim 12, wherein the driving profile substantially achieves:

$$\frac{\partial RPM(\text{end})}{\partial t} = 0.$$

14. The method as recited in claim 11, wherein the driving profile substantially minimizes at least one of an average power consumption, a peak power consumption, and a root-mean-square (RMS) power consumption of the data storage device during the seek.

15. The method as recited in claim 11, wherein the driving profile achieves a target weighting of at least two of an average power consumption, a peak power consumption, and a root-mean-square (RMS) power consumption of the data storage device during the seek.

16. The method as recited in claim 11, wherein the driving profile compensates for a power disturbance caused by accessing a non-volatile semiconductor memory during the seek operation.

17. The method as recited in claim 11, wherein the seek length comprises loading the head from a ramp over the disk.

18. The method as recited in claim 11, wherein the seek length comprises unloading the head from the disk onto a ramp.

19. The method as recited in claim 11, further comprising adjusting the amplitude of the periodic driving voltage at each of a plurality of servo sectors based on the driving profile.

20. The method as recited in claim 11, further comprising adjusting the amplitude of the periodic driving voltage so that a rotation speed of the spindle motor substantially equals an access rotation speed when accessing the disk, wherein the driving profile is configured to increase the rotation speed of the spindle motor at least five percent above the access rotation speed during at least part of the seek operation.

21. A data storage device comprising:
a head actuated over a disk;
a spindle motor configured to rotate the disk;
a ramp; and
control circuitry configured to:
rotate the spindle motor at a rotation speed proximate an access speed when accessing the disk, wherein the rotation speed deviates from the access speed by a maximum jitter error when accessing the disk;
increase a rotation speed of the spindle motor above the access speed by at least twice the maximum jitter error to increase a kinetic energy of the spindle motor; and
use at least part of the increase in kinetic energy of the spindle motor to unload the head onto the ramp.

22. The data storage device as recited in claim 21, wherein the control circuitry is configured to increase the rotation speed of the spindle motor by not more than 20% of the access speed.

23. A method of operating a data storage device, the method comprising:
rotate a spindle motor at a rotation speed proximate an access speed when accessing a disk, wherein the rotation speed deviates from the access speed by a maximum jitter error when accessing the disk;
increasing a rotation speed of the spindle motor above the access speed by at least twice the maximum jitter error to increase a kinetic energy of the spindle motor; and
using at least part of the increase in kinetic energy of the spindle motor to unload a head onto a ramp.

24. The method as recited in claim 23, wherein the rotation speed of the spindle motor is increased by not more than 20% of the access speed.

25. Control circuitry configured to:
commutate windings of a spindle motor based on a commutation sequence while applying a periodic driving voltage to each winding; and
during a seek operation to seek a head a seek length, adjust an amplitude of the periodic driving voltage according to a driving profile corresponding to the seek length, wherein the driving profile compensates for a power disturbance during the seek operation.

* * * * *